(12) United States Patent
Son (10) Patent No.: US 7,500,702 B2
(45) Date of Patent: Mar. 10, 2009

(54) SEAT HOLDING APPARATUS FOR MANUFACTURING VEHICLES

(75) Inventor: Hoon Son, Chungcheongnam-do (KR)

(73) Assignee: Hyundai Motor Company, Seoul (KR)

( * ) Notice: Subject to any disclaimer, the term of this patent is extended or adjusted under 35 U.S.C. 154(b) by 293 days.

(21) Appl. No.: 11/298,230

(22) Filed: Dec. 8, 2005

(65) Prior Publication Data
US 2007/0108815 A1 May 17, 2007

(30) Foreign Application Priority Data
Oct. 17, 2005 (KR) .................. 10-2005-0097394

(51) Int. Cl.
*B25J 15/00* (2006.01)
*B25J 13/08* (2006.01)

(52) U.S. Cl. .................. 294/88; 294/86.4; 294/907; 414/589; 414/732

(58) Field of Classification Search ............ 294/2, 294/88, 86.4, 907; 414/589, 590, 732; 901/39; 29/429, 430
See application file for complete search history.

(56) References Cited

U.S. PATENT DOCUMENTS

| 4,797,059 A | * | 1/1989 | Karg et al. ........... 414/590 |
| 5,833,432 A | * | 11/1998 | Fujii et al. ........... 414/732 |

FOREIGN PATENT DOCUMENTS

| JP | 60186389 | 9/1985 |
| JP | 62218289 | 9/1987 |
| JP | 63287683 | * 11/1988 |
| JP | 6344963 | 12/1994 |
| JP | 9286363 | 11/1997 |

* cited by examiner

*Primary Examiner*—Dean J Kramer
(74) *Attorney, Agent, or Firm*—Edwards Angell Palmer & Dodge LLP; Peter F. Corless

(57) ABSTRACT

The present invention provides a seat holding apparatus for manufacturing vehicles which is able to easily and reliably hold seats having various specifications so as to enable the seats to be installed into vehicle bodies. Preferred vehicle seat holding apparatus may comprise a back push unit; back push drive to rotate the back push unit; a cushion push unit; and cushion push drive.

8 Claims, 7 Drawing Sheets

SEAT HOLDING APPARATUS FOR MANUFACTURING VEHICLES

CROSS-REFERENCE TO RELATED APPLICATIONS

The present application is based on, and claims priority from, Korean Application Serial Number 10-2005-0097394, filed on Oct. 17, 2005, the disclosure of which is hereby incorporated by reference herein in its entirety.

FIELD OF THE INVENTION

The present invention relates to a seat holding apparatus for manufacturing vehicles and, more in preferred aspects, to an apparatus which holds a seat to assist automatic equipment in insertion of the seat into a vehicle body during a vehicle manufacturing process.

BACKGROUND OF THE INVENTION

To install seats in a vehicle body in an automatic assembly line for manufacturing vehicles, it is generally necessary to insert into a vehicle the vehicle body seats which have been produced through a production line separate from a vehicle body production line.

Seats can have varying specifications for even the same model of vehicle. Therefore, a seat holding apparatus should have a structure that is able to reliably hold seats having different specifications.

The information set forth in this Background of the Invention section is only for enhancement of understanding of the invention and should not be taken as an acknowledgement or any form of suggestion that this information forms the prior art that is already known to a person skilled in the art.

SUMMARY OF THE INVENTION

In one preferred aspect, a seat holding apparatus for manufacturing vehicles is provided which can readily and reliably hold seats having various specifications so as to insert the seats into vehicle bodies, and which has a small volume, thus facilitating a process of inserting a seat into a vehicle body.

Vehicle seat holding or mounting apparatus of the invention may preferably comprise a back push unit; back push drive to manipulate the back push unit; a cushion push unit; and cushion push drive.

In one preferred aspect, a seat holding apparatus for manufacturing vehicles includes a base. A clamp suitably protrudes from a lower end of the base such that the clamp is preferably inserted into a space defined between a seat cushion and a seat back. A back push unit is suitably rotatably mounted to an upper end of the base by a hinge. A back push drive apparatus is preferably employed and rotates the back push unit with respect to the base. A cushion push unit is suitably mounted to the base so as to be linearly movable downwards with respect to the base. A cushion push drive also is preferably employed and suitably moves e.g. linearly the cushion push unit with respect to the base.

The invention also includes vehicle manufacturing systems that comprises (i) a vehicle and (ii) a vehicle seat holding apparatus as described herein.

It is understood that the term "vehicle" or "vehicular" or other similar terms as used herein is inclusive of motor vehicles in general such as passenger automobiles, buses, trucks, various commercial vehicles, watercraft including a variety of boats, aircraft, and the like.

Other aspects of the invention are discussed below.

BRIEF DESCRIPTION OF THE DRAWINGS

For a better understanding of the nature and objects of the present invention, reference should be made to the following detailed description with the accompanying drawings, in which.

DETAILED DESCRIPTION OF THE INVENTION

As discussed above, vehicle seat holding or mounting apparatus are provided which suitably comprise a back push unit; back push drive to manipulate the back push unit; a cushion push unit; and cushion push drive. Preferably, a vehicle seat holding apparatus further comprising a base unit as well as a clamp unit. The clamp suitably protrudes from a lower end of the base and the clamp is inserted between a seat cushion and a seat back. Suitably, a back push unit is mounted (preferably rotatably) to a base unit, preferably an upper portion or end of a base unit. Preferably, the back push drive can rotate the back push unit with respect to the base. The cushion push unit is preferably mounted to the base unit so as to be linearly movable downwards with respect to the base. Preferably, the cushion push drive can move (particularly, linearly) the cushion push unit with respect to the base.

A preferred embodiment of the present invention is now described with reference to the accompanying drawings.

Referring now to FIGS. 1 through 7, a seat holding apparatus according to a preferred embodiment of the present invention suitably includes a base 1 and a clamp 9 which protrudes from a lower end of the base 1 such that the clamp 9 is inserted into a space interposed or defined between a seat cushion 5 and a seat back 7 of a seat 3. The seat holding apparatus suitably may further include a back push unit 11 which is rotatably mounted to an upper end of the base 1 such as with a hinge, a back push drive which preferably can rotate the back push unit 11 with respect to the base 1, a cushion push unit 13 which is suitably mounted to the base 1 so as to be movable downwards (particularly movable linearly downwards) with respect to the base 1, and a cushion push drive which moves (preferably, linearly) the cushion push unit 13 with respect to the base 1.

In this preferred embodiment, the base 1 suitably includes two base plates 15 which are preferably oriented in vertical directions and are parallel with each other, an upper member 17 and a lower member 19 which are suitably provided between the two base plates 15, and an adaptor plate 21 which couples the two base plates 15 to each other such that positions of the two base plate 15 can be adjusted by an outside manipulation or force.

Furthermore, preferably, an adaptor 23 to be coupled to a robot is mounted preferably to an end of the adaptor plate 21.

The clamp 9 is suitably fastened to the lower member 19, which is provided between the two base plates 15. The clamp 9 comprises a plate having a C-shaped cross-section such that it is able to abut seat back 7, particularly surround a lower end of the seat back 7.

The back push unit 11 suitably includes a back push frame 25, which is coupled to upper ends of the base plates 15 by a hinge, and a back push plate 27, which is mounted to the back push frame 25 and faces a direction in which the clamp 9 protrudes. The back push unit 11 preferably further includes a seat back detecting which suitably detects whether the back push plate 27 is proximate to seat back 7.

In preferred configurations, back push frame 25 includes one or more rotating arms 29 (preferably two rotating arms) which are coupled to the base plates 15 such as by a hinge, and a connection unit 31 which couples the two rotating arms 29 to each other. The back push plate 27 is suitably fastened to the connection unit 31.

The seat back detection unit preferably includes a detecting aperture (e.g. hole) which is formed through the back push plate 27, a detecting cam 33 which is suitably configured whereby detecting cam 33 protrudes from a surface of the back push plate 27 through the detecting aperture, and a micro switch 35 which changes electrical continuity thereof, depending on rotation of the detecting cam 33.

The back push drive suitably comprises a back push cylinder 37 which is preferably provided between the back push frame 25 and the adaptor plate 21.

In a specifically preferred design, the back push cylinder 37 is rotatably coupled at an upper end thereof to the connection unit 31 of the back push frame 25 and is rotatably coupled at a lower end thereof to an upper surface of the adaptor plate 21.

The cushion push unit 13 suitably includes a linear guide 39 which is provided on a sidewall of the base plate 15, and a guide bar 41 which linearly moves upwards and downwards while being guided by the linear guide 39. The cushion push unit 13 suitably further includes a cushion push plate 43 which is provided under a lower end of the guide bar 41 and presses an upper surface of the seat cushion 5, and a cushion detection unit which can detects whether the cushion push plate 43 is proximate to seat cushion 5.

The cushion detection unit suitably includes a detecting aperture (e.g., hole) which is formed through the cushion push plate 43, a detecting cam 33 which is constructed such that the detecting cam 33 protrudes from a surface of the cushion push plate 43 through the detecting aperture, and a micro switch 35 which changes electrical continuity thereof, depending on rotation of the detecting cam 33.

The cushion push drive suitably comprises a cushion push cylinder 45 which is provided between the base plate 15 and the cushion push frame 43.

In a specifically preferred design, the cushion push cylinder 45 is rotatably coupled at an upper end thereof to the upper member 17 and is rotatably coupled at a lower end thereof to an upper surface of the cushion push plate 43.

In a preferred configuration, a controller can be employed and can determine whether the back push plate 27 reliably pushes the seat back 7 and whether the cushion push plate 43 reliably pushes the seat cushion 5, using signals transmitted from the micro switches 35 mounted to the back push plate 27 and the cushion push plate 43. The controller may be suitably combined with a controller for a robot. Alternatively, the controller may be provided separately from, and communicate with, the controller for a robot.

A preferred seat holding apparatus as generally described herein can be suitably operated as follows.

Figure 1:
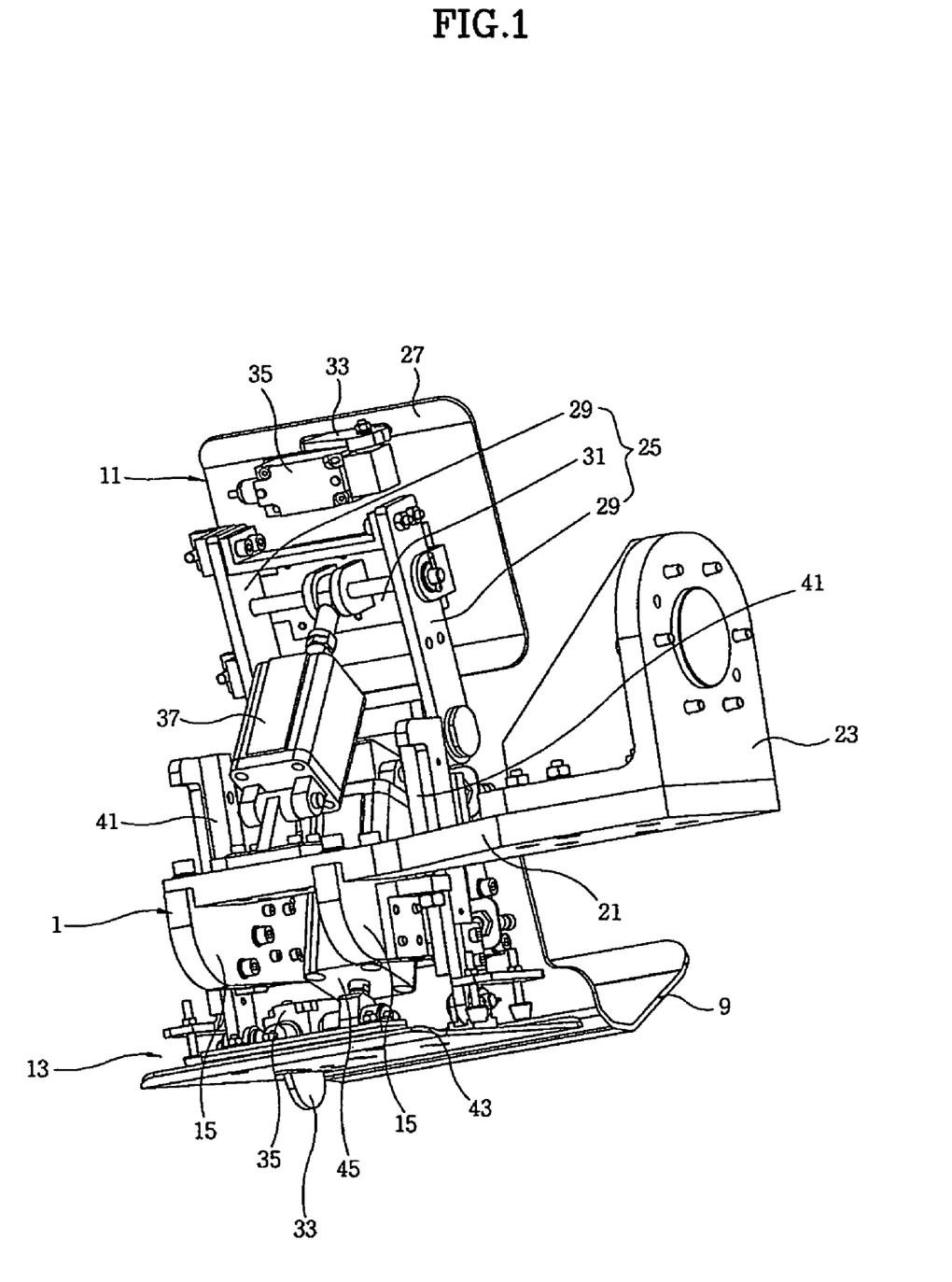
FIGS. 1 through 5 are views showing a seat holding apparatus for manufacturing vehicles, according to an embodiment of the present invention.
Figure 2:
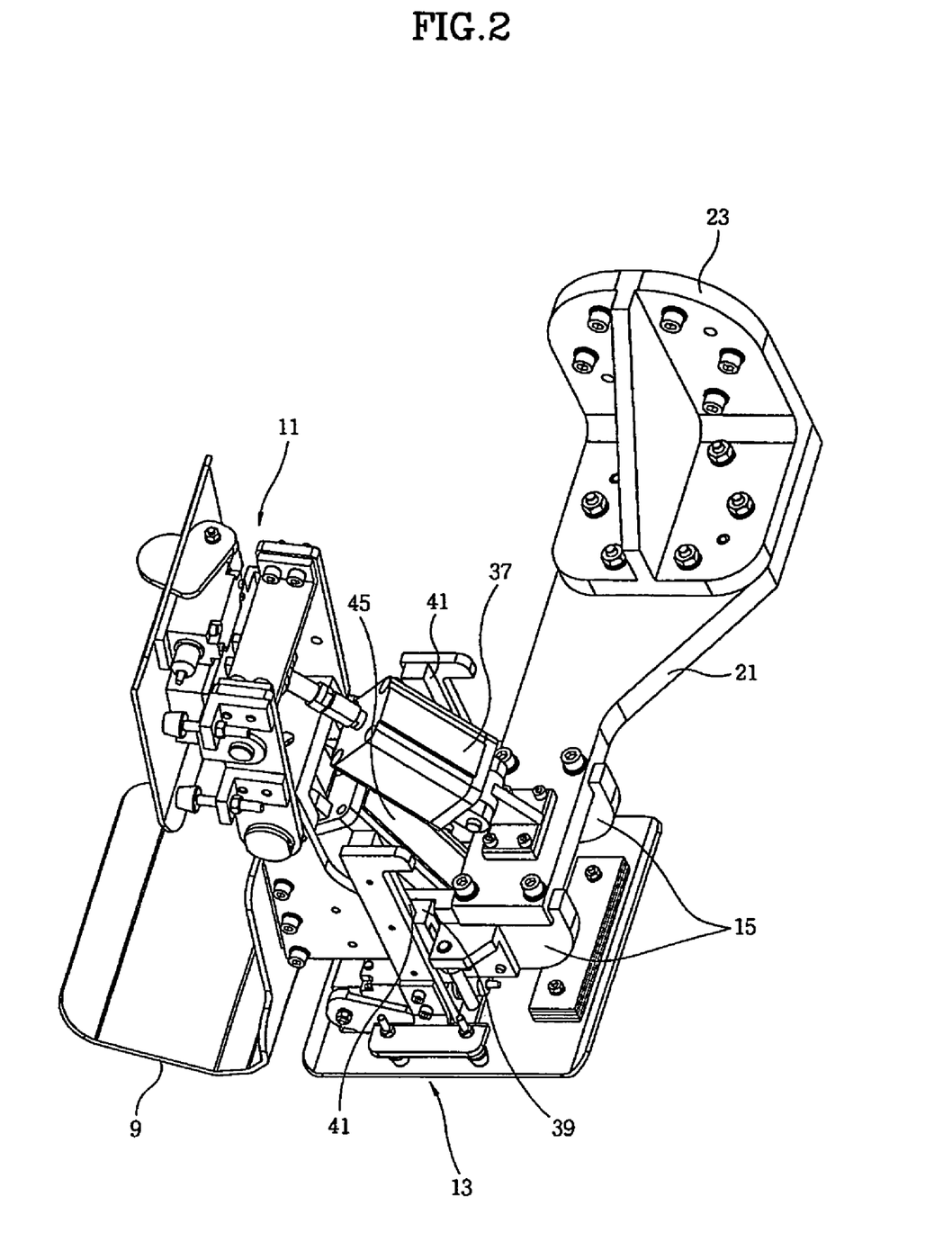
Figure 3:
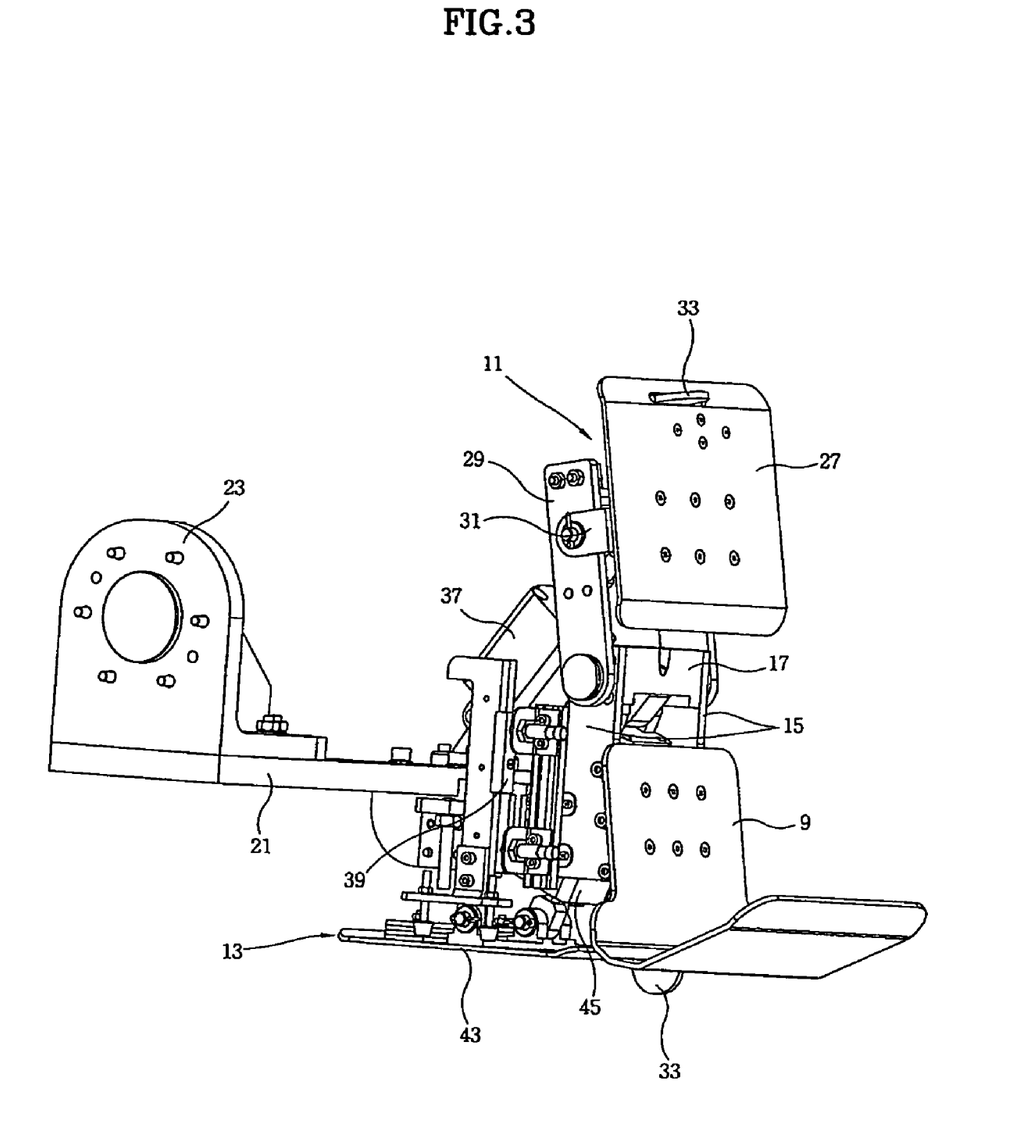
Figure 4:
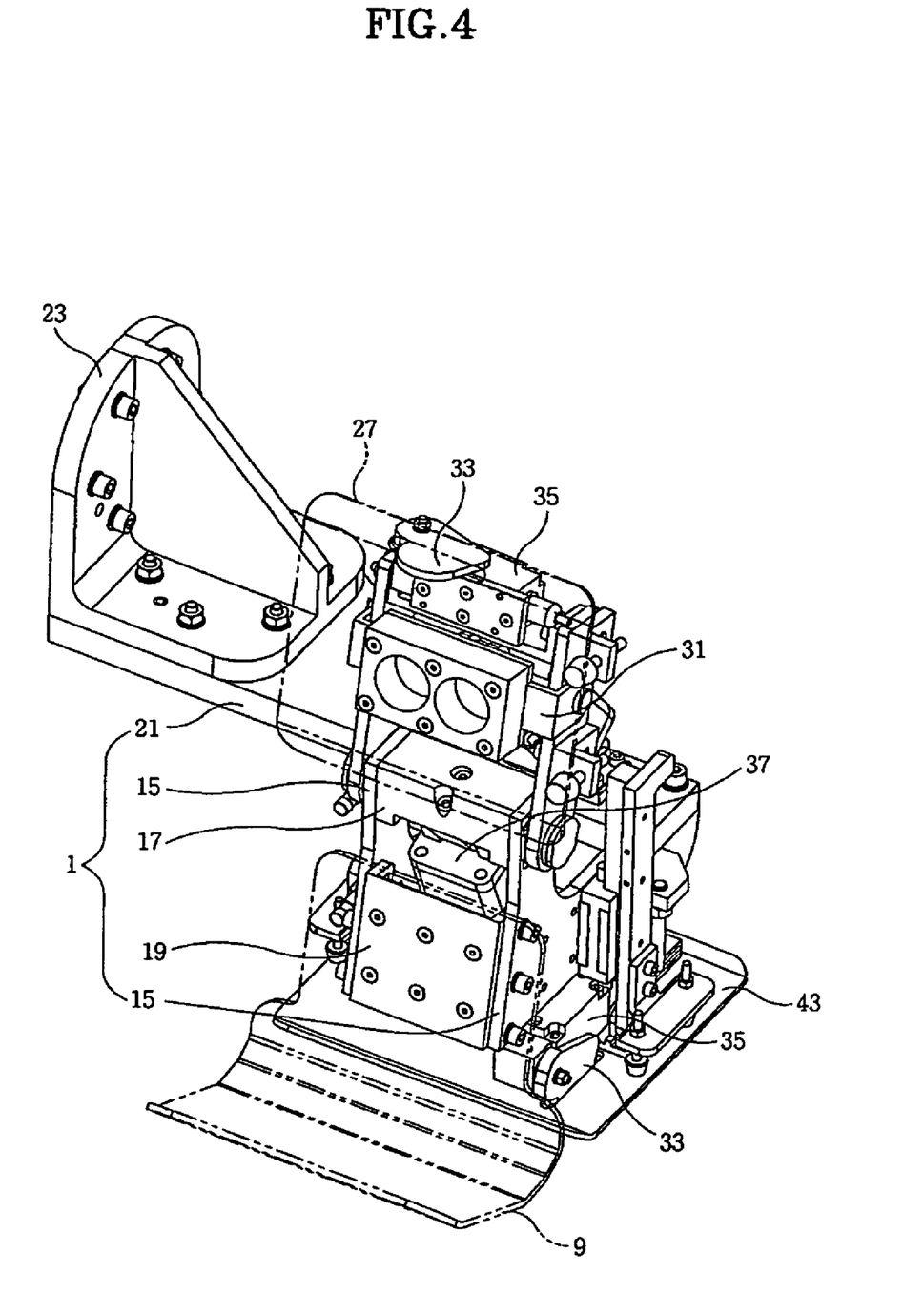
Figure 5:
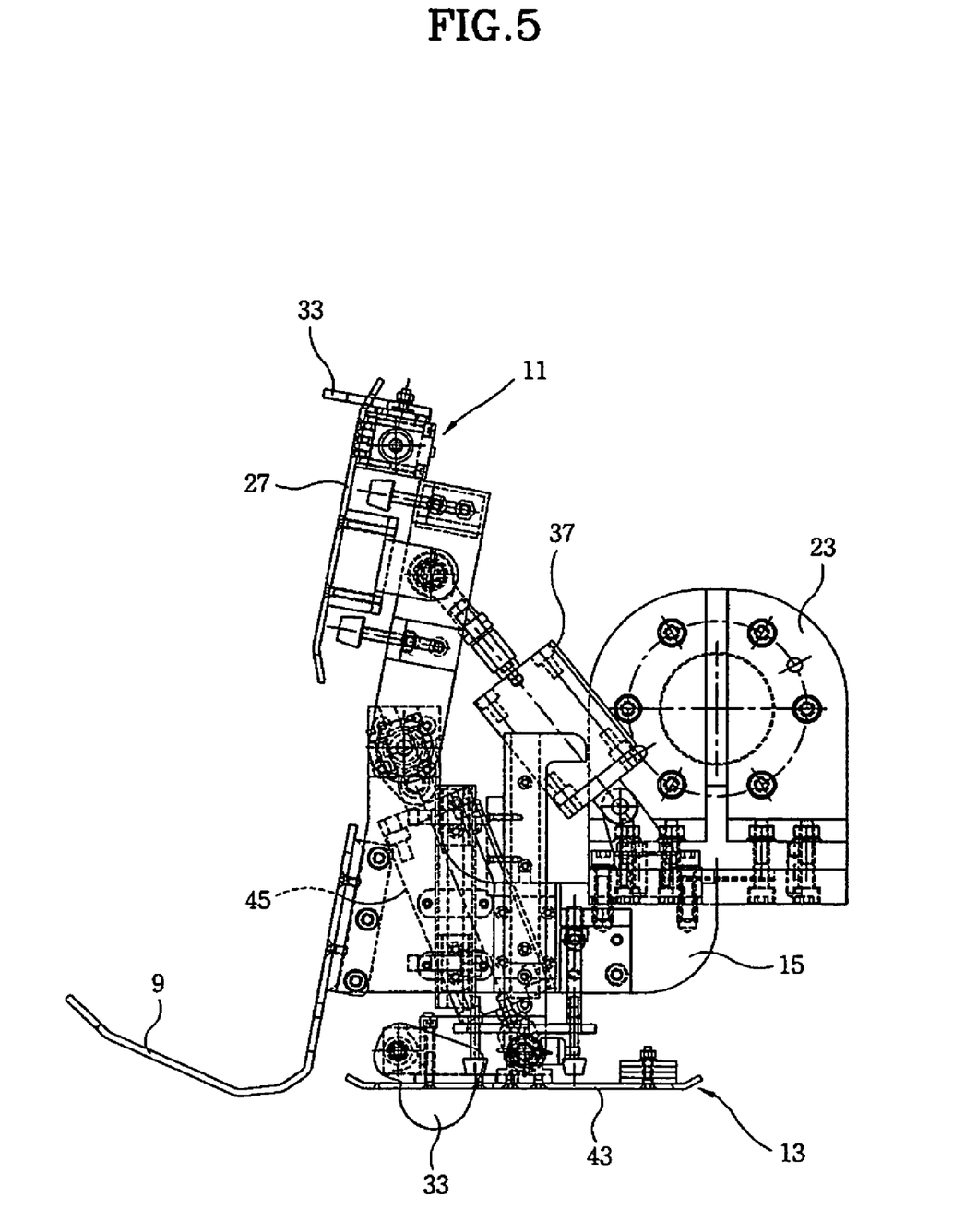
Figure 6:
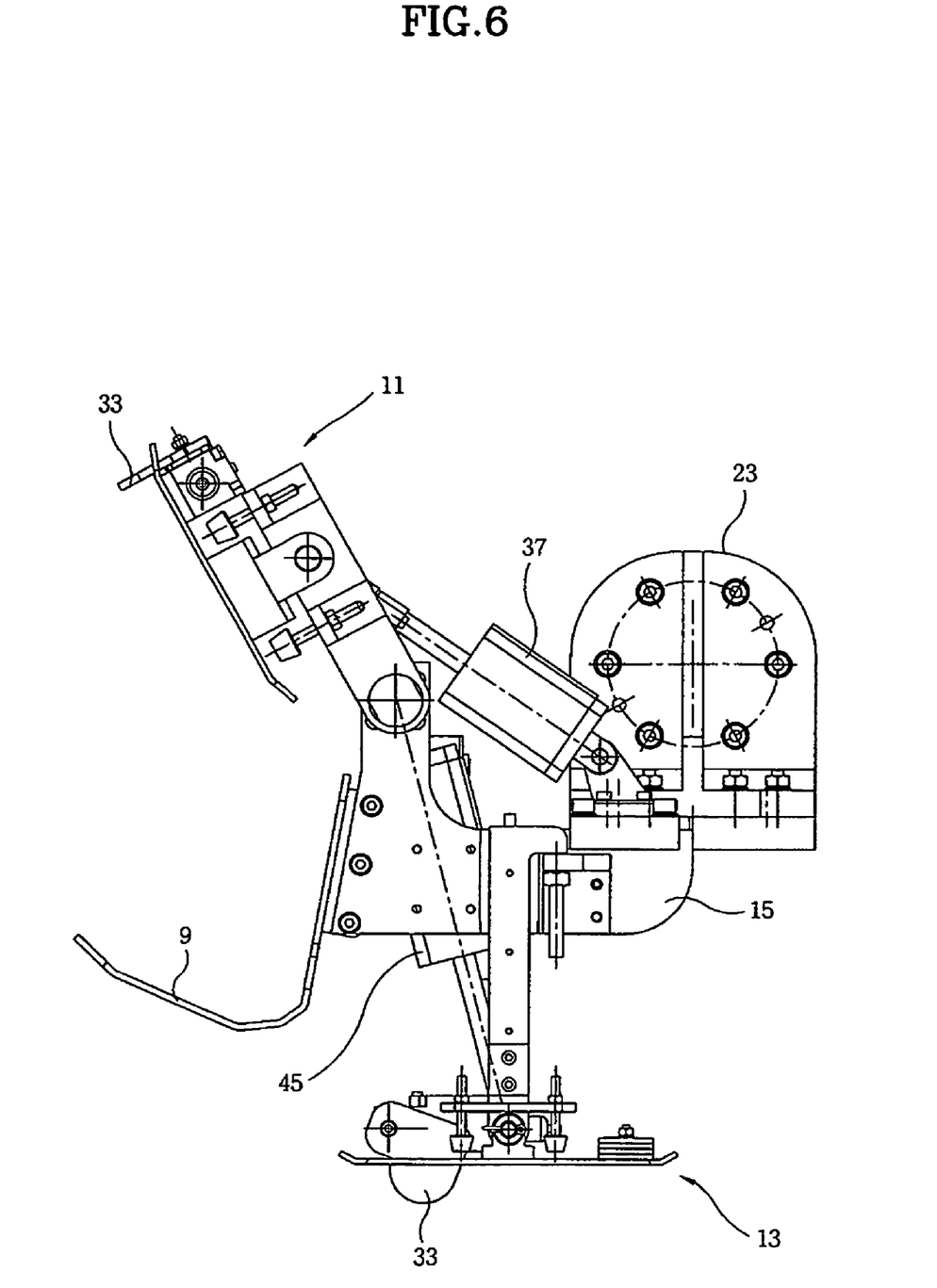
FIG. 6 is a view showing operations of a back push unit and a cushion push unit of the seat holding apparatus, for comparison with FIG. 5.
Figure 7:
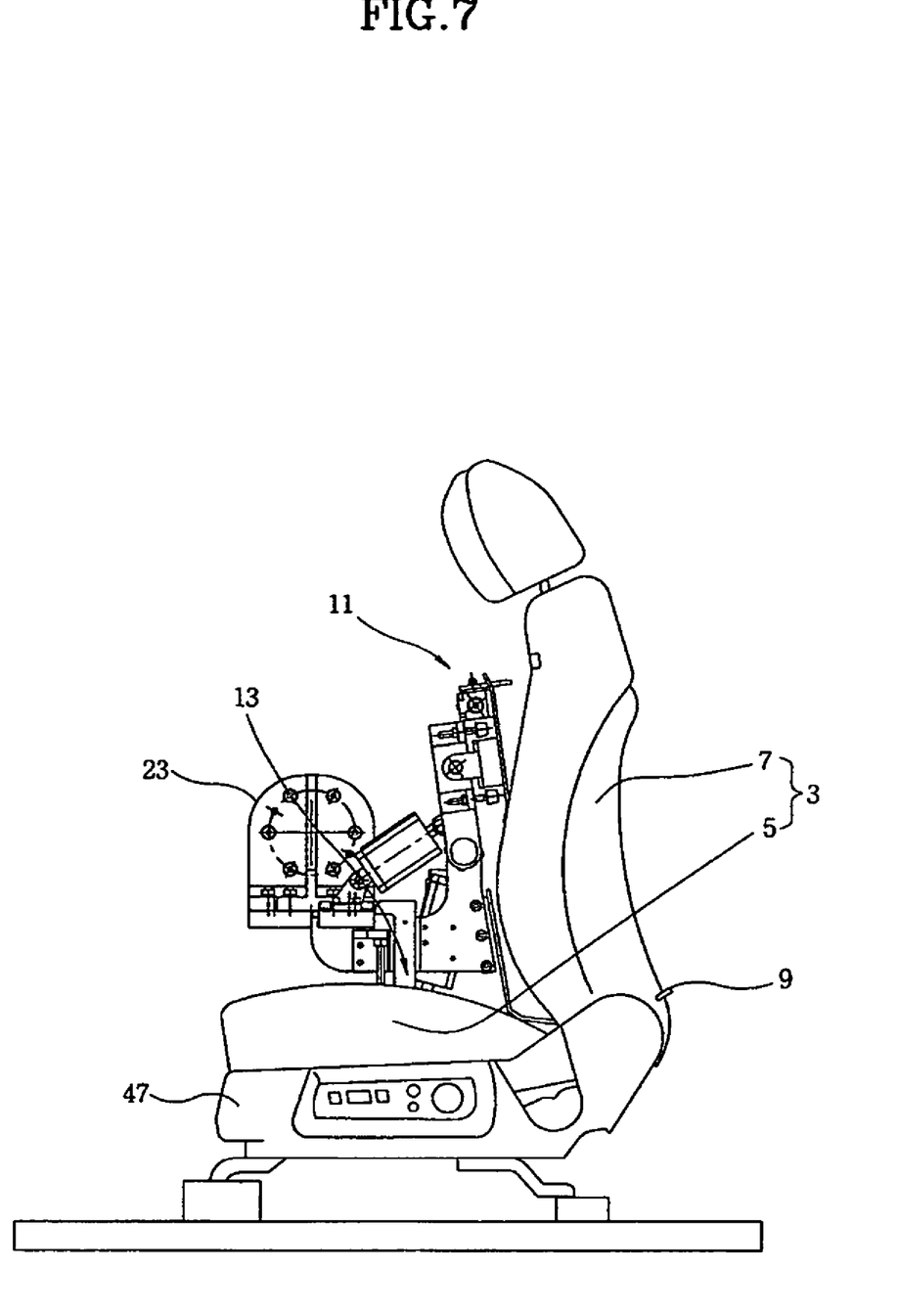
FIG. 7 is a view showing a state in which the seat holding apparatus holds a seat of a vehicle, according to the present invention.

The robot, coupled to the adaptor, moves the base 1 and inserts the clamp 9 between the seat cushion 5 and the seat back 7 of the seat 3 (see, FIG. 7).

Then, the clamp 9 can abut or preferably surround the lower end of the seat back 7 and be positioned to raise the seat 3.

By that configuration clamp 9 can be employed to raise the seat 3, but if the seat 3 is raised from that position, the seat 3 potentially may tilt due to its weight, which would render seat 3 possibly unstable.

Therefore, to address that possible instability, after the clamp 9 is inserted between the seat back 7 and the seat cushion 5, the back push cylinder 37 is operated whereby the back push plate 27 engages the seat back 7.

When the back push plate 27 sufficiently engages (e.g. pushes) the seat back 7, the detecting cam 33, which has protruded from the back push plate 27, is retracted and rotated. Then, the micro switch 35 detects the rotation of the detecting cam 33 and generates a signal.

The controller receives the signal from the micro switch 35, thereby ensuring that the back push plate 27 reliably engages the seat back 7.

Thereafter, the cushion push cylinder 45 is operated, so that the cushion push plate 43 presses the upper surface of the seat cushion 5.

When the cushion push plate 43 sufficiently presses the seat cushion 5, the micro switch 35 operates. Thereby, the controller assures the reliable operation of the cushion push plate 43.

As such, when the back push plate 27 engages (e.g. pushes) the seat back 7 and the cushion push plate 43 engages or pushes the seat cushion 5 while the clamp 9 surrounds the lower end of the seat back 7, the seat 3 is securely held by the seat holding apparatus. Then, while the robot moves the seat holding apparatus and inserts the seat 3 into a vehicle, the seat 3 can maintain a stable state.

Additionally, as shown in FIG. 7, because the seat holding apparatus is able to securely hold the seat 3 without protruding outside of a space of the seat 3 defined in front of the seat back 7 and above the seat cushion 5, the seat holding apparatus is prevented from interfering with holes of the vehicle body when the seat 3 is inserted into the vehicle body.

Preferred seat holding apparatus of the invention also can readily hold the seat 3 regardless of the size or thickness of the seat cushion 5 and the seat back 7 or regardless of whether a shield cover 47 has been installed on a lower portion of the seat cushion 5. Consequently, despite the variety of seats 3 to be installed in vehicles, preferred seat holding apparatus of the present invention can be easily used without modifying the construction thereof.

As is apparent from the foregoing, preferred apparatus of the invention can readily and reliably hold seats having various specifications so as to enable the seats to be installed into vehicle bodies. Furthermore, apparatus can suitably have a relatively small volume, thus further facilitating the process of inserting a seat into a vehicle body.

While the invention has been described with reference to specific embodiments, modifications and variations may be constructed without departing from the scope of the invention, which is defined in the following claims.

What is claimed is:

1. A seat holding apparatus for manufacturing vehicles, comprising:
 a base comprising: (i) two base plates vertically oriented and being parallel to each other, (ii) an upper member and a lower member provided between the two base plates, and (iii) an adaptor plate coupling the two base plates to each other such that positions of the two base plates are adjustable by an outside force;

a clamp protruding from a lower end of the base such that the clamp is inserted between a seat cushion and a seat back;

a back push unit rotatably mounted to an upper end of the base;

back push drive to rotate the back push unit with respect to the base;

a cushion push unit mounted to the base so as to be linearly movable downwards with respect to the base; and cushion push drive to linearly move the cushion push unit with respect to the base.

2. The seat holding apparatus of claim 1, wherein the clamp comprises a plate having a C-shaped cross-section to surround a lower end of the seat back.

3. The seat holding apparatus of claim 1, wherein the back push unit comprises:

a back push frame coupled to upper ends of the base plates by a hinge;

a back push plate mounted to the back push frame and facing a protruding direction of the damp; and seat back detection unit that can detect whether the back push plate is positioned proximate to the seat back.

4. The seat holding apparatus of claim 3, wherein the seat back detection unit comprises:

a detecting aperture formed through the back push plate;

a detecting cam constructed such that the detecting cam protrudes from a surface of the back push plate through the detecting aperture; and a micro switch changing electrical continuity thereof depending on rotation of the detecting cam.

5. The seat holding apparatus of claim 3, wherein the back push drive comprises a back push cylinder provided between the back push frame and the adaptor plate.

6. The seat holding apparatus of claim 1, wherein the cushion push unit comprises:

a linear guide provided on a sidewall of the base plates;

a guide bar to linearly move upwards and downwards while being guided by the linear guide;

a cushion push plate provided under a lower end of the guide bar to press an upper surface of the seat cushion; and cushion detection unit detecting whether the cushion push plate is positioned proximate to the seat cushion.

7. The seat holding apparatus of claim 6, wherein the cushion detection unit comprises:

a detecting aperture formed through the cushion push plate;

a detecting cam constructed such that the detecting cam protrudes from a surface of the cushion push plate through the detecting aperture; and a micro switch changing electrical continuity thereof depending on rotation of the detecting cam.

8. The seat holding apparatus of claim 6, wherein the cushion push drive comprises a cushion push cylinder provided between the base plates and the cushion push plate.

* * * * *